(No Model.)
J. D. POWELL.
BAND CUTTING AND FEEDING MACHINE.
No. 577,782.                                      Patented Feb. 23, 1897.
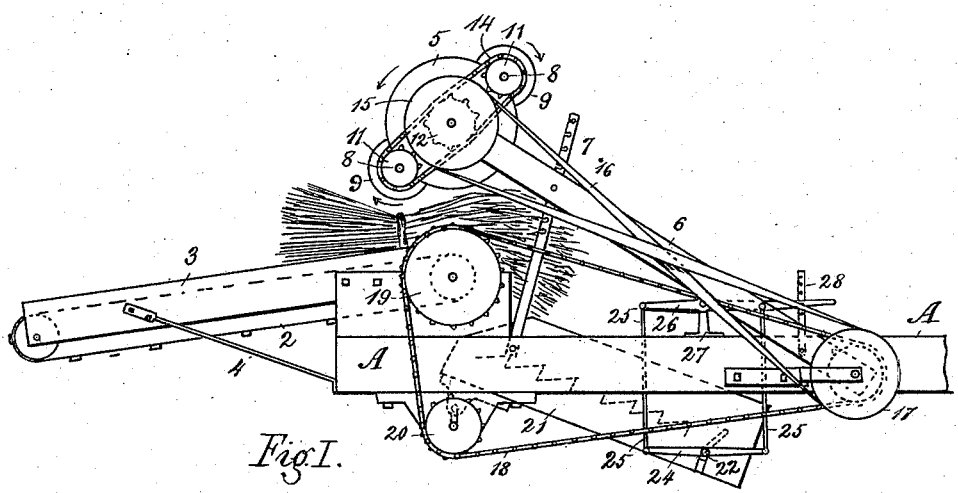
Fig. I.
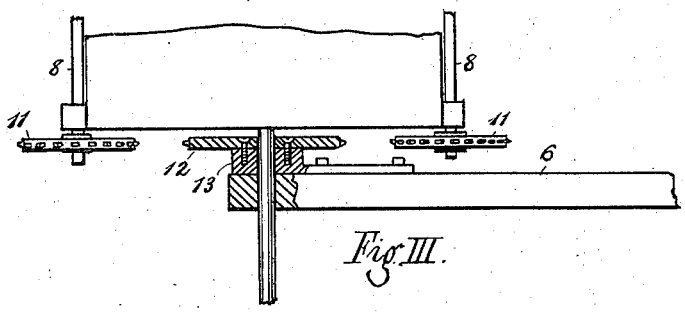
Fig. III.
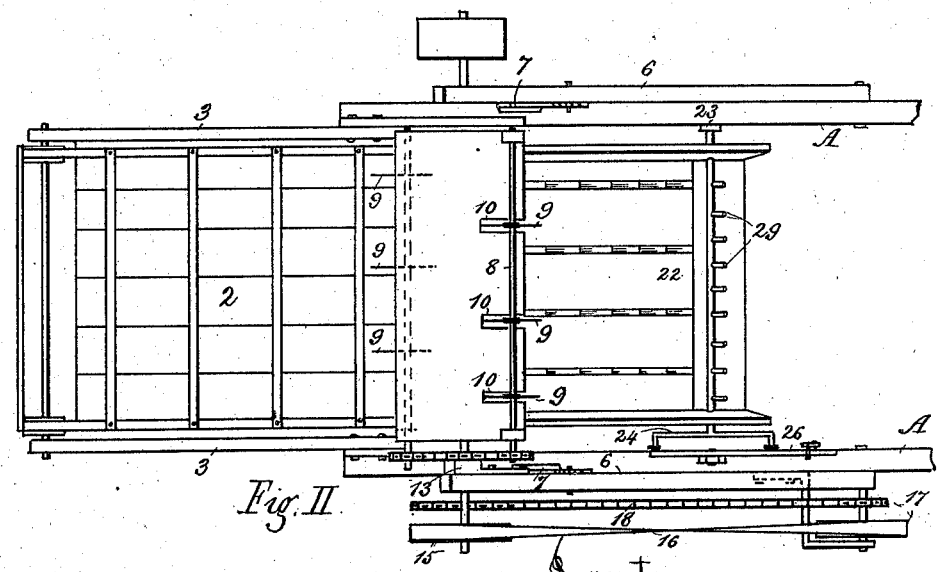
Fig. II.
Witnesses,
R. S. Millar
L. M. Adams
Inventor,
J. D. Powell
By

UNITED STATES PATENT OFFICE.

JOHNATHAN D. POWELL, OF DEANVILLE, MICHIGAN.

BAND-CUTTING AND FEEDING MACHINE.

SPECIFICATION forming part of Letters Patent No. 577,782, dated February 23, 1897.

Application filed December 3, 1895. Serial No. 570,869. (No model.)

*To all whom it may concern:*

Be it known that I, JOHNATHAN D. POWELL, a citizen of the United States, residing at Deanville, in the county of Lapeer and State of Michigan, have invented a new and useful Improvement in Band-Cutting and Feeding Machines, which improvement is fully set forth in the following specification and accompanying drawings, in which—

Figure 1 is a side elevation of my improved cutting and feeding machine; Fig. 2, a plan view, and Fig. 3 a detail view showing the arrangement of the stationary sprocket which actuates the cutting apparatus.

My invention relates to certain improvements in cutting and feeding attachments for threshing-machines; and its object is to provide a novel, useful, and reliable device combining efficiency and durability with economy in the amount of power required for its operation.

The peculiar features and special advantages of the invention will be apparent by referring to the accompanying drawings, in which—

A A indicate the side beams of the main frame. These are designed to be secured by bolts to similar beams which extend rearwardly from the threshing-machine. The endless carrier 2 is journaled in the end of a supplemental frame 3, which is connected to the main frame and supported by braces 4. The hollow cylinder 5, which carries the cutting apparatus, is journaled in the upper ends of link-bars 6, the lower ends of which are pivotally attached to the outer sides of the main beams A. The cylinder may thus be vertically adjusted and held at any desired elevation by the notched standards 7. The several advantages of this arrangement will be apparent without further description.

Shafts 8 revolve in suitable bearings at diametrically opposite points on the surface of the cylinder and carry a series of circular cutting-knives 9.

Transverse slots 10 are cut in the cylinder to admit the knives and allow them to rotate. The said shafts are provided on one end with sprocket-pinions 11. Midway between these a stationary sprocket 12, having a central aperture which allows free movement of the cutter-shafts 8, is rigidly attached to the adjoining beam by a plate 13, as shown in the drawings. It will be observed that when the cylinder revolves the stationary sprocket engages the sprocket-chain 14 and causes a rotary movement of the cutter-shafts in the direction indicated by darts in the drawings. The cutters being operated by a compound orbital and rotary movement are thus adapted to perform their work more perfectly than the various devices hitherto employed for like purposes. The combined rolling and shearing movement insures the best and easiest cutting action, and the entire peripheries of the cutters being brought into play the edges will last longer, less motive power will be required, the straw cannot wrap itself around the cylinder and clog its action, and the grain will be delivered uniformly to the thresher.

A pulley 15 attached to the outer end of the cylinder-shaft imparts motion, by means of a cross-belt 16, to a double pulley 17, the inner portion of which is sprocketed. From this a sprocket-belt 18 extends rearwardly around the sprocket-wheels 19 and 20. The former drives the carrier 2, while the latter, having a crank-shaft, imparts motion to the shaker 21, the forward end of which is upheld by a shaft 22. The end of said shaft swings on a link-bar 23, while the opposite end is provided with a cross-arm 24, the ends of which are pivotally attached to vertical link-bars 25. The upper ends of these links are similarly attached to a horizontal lever 26, which is pivoted near its center in the top of a standard 27, its free end being adjustable in a notched standard 28.

The object of the construction just described is to regulate the delivery of grain from the feeder to the thresher.

It is well known that when grain is in a damp condition it is difficult to loosen and apt to remain in separate masses or wads. In order to overcome that tendency, the body of the shaft 22, which traverses the bottom of the shaker, is provided with a series of teeth 29. It will be understood that when the grain is dry the combined action of the cutters and the shaker suffices to loosen the straw and prepare it for delivery to the thresher. If, on the other hand, the straw be damp, the lever 26 is raised and elevates the teeth 29. The lower portion of the mass is thus retarded, while the upper portion passes first into the thresher. This is followed by the lower portion, and an "over-and-over" tumbling motion is produced, which greatly facilitates the loosening and regular feeding of the mass.

What I claim as new is—

1. In a band-cutter the combination with the main and supplemental frames and the endless straw-carrier, of the links pivoted to said main frame, the hollow cylinder journaled to the free ends thereof, and formed with a series of slots, the transverse shafts, journaled to said cylinder diametrically opposite each other, the circular knives carried thereby, the sprockets at one end of said shaft, the sprocket-chain engaging therewith, the stationary sprocket secured to one of said links with which said chain also engages and the pulley and belt connected with said cylinder, substantially as described.

2. In a band-cutter for threshing-machines, the combination with the rotatable cylinder, and the shafts journaled thereto diametrically opposite each other provided with circular cutting-knives, of the sprockets secured to said shafts, the sprocket-chain engaging therewith, the stationary sprocket with which said chain also engages, and means for rotating said cylinder whereby an orbital movement is given to the shafts and knives, substantially as described.

3. In a band-cutter for threshing-machines, the combination with the main and supplemental frames, the links pivoted to the main frame, the hollow cylinder journaled thereto formed with a series of slots, the diametrically opposite shafts journaled to said cylinder, the circular knives carried thereby, the sprockets on the ends of said shaft, the sprocket-chains, the stationary sprocket secured to said links, and the pulley and belt connected with said cylinder, of the pulley around which said belt also passes, its shaft, the sprocket-wheel secured thereto, the sprocket-chain and sprocket-wheels, the shafts to which said wheels are secured, the straw-carrier, and the shaker, substantially as described.

In testimony that I claim the foregoing I have hereunto set my hand, this 16th day of November, 1895, in the presence of witnesses.

JOHNATHAN D. POWELL.

Witnesses:
R. G. BROWN,
FRANK SNYDER.